United States Patent [19]
Bridges et al.

[11] Patent Number: 5,809,293
[45] Date of Patent: Sep. 15, 1998

[54] SYSTEM AND METHOD FOR PROGRAM EXECUTION TRACING WITHIN AN INTEGRATED PROCESSOR

[75] Inventors: Jeffrey Todd Bridges, Raleigh; Thomas K. Collopy, Cary; James N. Dieffenderfer, Apex; Thomas Joseph Irene, Raleigh; Harry I. Linzer, Raleigh; Thomas Andrew Sartorius, Raleigh, all of N.C.

[73] Assignee: International Business Machines Corporation, Armonk, N.Y.

[21] Appl. No.: 283,128

[22] Filed: Jul. 29, 1994

[51] Int. Cl.[6] .................................................... G06F 9/00
[52] U.S. Cl. ............................................. 395/568; 395/580
[58] Field of Search ................................. 395/183.1, 275, 395/375, 368, 580

[56] References Cited

U.S. PATENT DOCUMENTS

| | | |
|---|---|---|
| 4,674,089 | 6/1987 | Poret et al. . |
| 5,053,949 | 10/1991 | Allison et al. ........................... 364/200 |
| 5,253,255 | 10/1993 | Carbine et al. . |
| 5,313,583 | 5/1994 | Yokota et al. ............................ 395/275 |
| 5,442,756 | 8/1995 | Grochowski et al. ................... 395/375 |
| 5,488,688 | 1/1996 | Gonzales ............................... 395/183.1 |
| 5,586,336 | 12/1996 | Nakamura et al. ...................... 395/568 |

*Primary Examiner*—Jack B. Harvey
*Assistant Examiner*—David A. Wiley
*Attorney, Agent, or Firm*—Steven B. Phillips; Jenkins & Gilchrist

[57] ABSTRACT

A system and method for tracing program code within a processor having an embedded cache memory. The non-invasive tracing technique minimizes the need for trace information to be broadcast externally. The tracing technique monitors changes in instruction flow from the normal execution stream of the code. The tracing technique monitors the updating of processor branch target register contents in order to monitor branch target flow of the code. A FIFO and serial logic circuitry is utilized to minimize the number of chip pins required to broadcast the information from the chip. The tracing technique utilizes instruction and data breakpoint debug functions to signal an external trace tool that a trace event has occurred.

29 Claims, 6 Drawing Sheets

SYSTEM AND METHOD FOR PROGRAM EXECUTION TRACING WITHIN AN INTEGRATED PROCESSOR

TECHNICAL FIELD OF THE INVENTION

The present invention relates generally to data processing systems, and more particularly, to program execution tracing within an integrated processor.

BACKGROUND OF THE INVENTION

The increase in use of very large scale integrated ("VLSI") circuit technologies has enabled the integration of entire systems and sub-systems onto a single chip. This integration has led to increased performance on critical processor data and instruction buses through the use of internal data and instruction caches. However, a negative result of this increased integration is a significantly reduced ability to easily access particular buses needed for monitoring processor activity. For instance, an instruction cached design inhibits the ability to monitor and capture the program instruction flow since the instructions are fetched from an embedded cache instead of memory external to the processor. In fact, for efficient cache designs, there is a high probability that the instructions will reside in cache and will not be visible from the external pins of the microprocessor. It is also possible that the entire program may reside in embedded cache, thereby making it virtually impossible to follow instruction execution externally.

The following of instruction execution within a microprocessor (also referred to as "tracing") is desirable for monitoring and debugging the code within the processor. It also may provide insight into any hardware-related problems with the microprocessor. Further, tracing allows a microprocessor designer or troubleshooter the ability to observe the execution of code within the microprocessor to ensure that it operates in the manner it was designed.

If a microprocessor does not utilize an embedded instruction cache(s), then the monitoring of the code within the microprocessor is performed by monitoring external signals emanating from the microprocessor on its I/O pins. However, as discussed above, when the code is stored within an embedded cache on the microprocessor chip, such external signals are not provided.

One prior art solution to this problem is to dedicate a number of pins on the chip that are coupled to specified locations within the microprocessor in order to monitor these internal signals. A problem with such a solution is that chip pins are often at a premium. As integrated circuit packages become more and more complex, it is desirable to minimize the use of additional pins required for tracing instruction flow so that these pins may be utilized elsewhere.

Other prior art solutions to the tracing of instruction flow tend to be intrusive, i.e., they utilize additional hardware to accomplish the tracing, which may modify the operational behavior of the processor, while being traced, from its normal mode of operation. This is especially deleterious for real-time applications that are highly dependent upon low latency interrupt handling. As an example, when tracing is utilized for debugging, if the microprocessor performs differently when the tracing is invoked, the actual problem could be masked due to different execution timing caused by the tracing hardware.

A related problem is the "stalling" of the microprocessor during the tracing process, which occurs when the tracing hardware becomes overloaded with tracing information to broadcast externally from the chip. Again, the normal operational flow of the microprocessor is affected.

Thus, there is a need in the art for a tracing technique that has the ability to trace code within microprocessors having embedded instruction caches. There is also a need in the art for a tracing technique that minimizes the utilization of hardware and microprocessor chip pins. There is yet another need in the art for a tracing technique that is non-invasive. There is additionally a need in the art for a tracing technique that does not cause the microprocessor to "stall" during the tracing process.

SUMMARY OF THE INVENTION

It is therefore an object of the present invention to non-invasively trace real-time program execution in embedded instruction cached microprocessors. The tracing technique is performed in such a way that minimizes the trace information needed to be broadcasted externally and with a minimum of internal hardware.

In the attainment of the above object, the present invention, upon initiation of the trace technique, monitors changes in instruction flow from the normal execution stream of the code, based on various microprocessor conditions. Using this monitored information and a copy of the original source code, a user with an appropriately configured trace tool can determine whether or not the code is operating as designed within the microprocessor.

The present invention essentially monitors the updating of the microprocessor branch target register contents in order to monitor branch target flow of the code. A FIFO (a first in, first out queue) is utilized to collect this information for broadcast externally to a trace tool coupled to the present invention. This buffered broadcast scheme then utilizes serial logic circuitry to serialize the data from the FIFO in order to minimize the number of chip pins required to broadcast the information from the chip. The FIFO is designed to be large enough to minimize stalling of the microprocessor while being small enough so as not to take up too much space on the chip.

The present invention utilizes instruction and data breakpoint debug functions, chosen by the user, to signal an external trace tool that a trace event has occurred. This enables the external trace tool to begin collecting the necessary information from the present invention in order to determine the actual sequence of instructions the microprocessor executed while running in real time.

In a specific embodiment of the present invention, the link register, count register and instruction address register within the microprocessor are each monitored by the present invention and their contents stored within the FIFO. Thus, only the address associated with the move-to-link register ("MTLR"), move-to-count register ("MTCTR") and exception events are broadcast from the FIFO through the serial logic to the external trace tool. The occurrences of these addresses are much less frequent within the microprocessor than the branch instructions themselves. Based on a statistical analysis, the FIFO is required to be merely four entries deep so that the microprocessor does not "stall" as a result of the present invention under any reasonable sequence of instructions.

In a preferred embodiment of the present invention, status logic circuitry is utilized to encode and broadcast, every microprocessor cycle, an indication that (1) no instruction has been executed by the microprocessor, (2) an exception has occurred, (3) one instruction has been executed and is not a taken branch, (4) one instruction has been executed and a branch has been taken, (5) two instructions have been executed with the second one being a taken branch, or (6) two instructions have been executed with neither being a taken branch. With the present embodiment of the invention, this is the complete list of occurrences. These encoded signals are also supplied to the trace tool to assist in its tracing of the code as it is executed within the microprocessor.

Once the external trace tool has captured the appropriate trace information from the present invention, a reconstruction algorithm can reconstruct the execution flow of the code. Such trace tools and logic circuitry required for reconstructing such an algorithm are well within the scope of knowledge of those skilled in the art. The present invention functions continuously regardless of whether or not a trace has been enabled by a user. This assists in providing a totally non-invasive tracing, which does not affect microprocessor performance.

The foregoing has outlined rather broadly the features and technical advantages of the present invention in order that the detailed description of the invention that follows may be better understood. Additional features and advantages of the invention will be described hereinafter which form the subject of the claims of the invention.

BRIEF DESCRIPTION OF THE DRAWING

For a more complete understanding of the present invention, and the advantages thereof, reference is now made to the following descriptions taken in conjunction with the accompanying drawings, in which.

DETAILED DESCRIPTION OF A PREFERRED EMBODIMENT OF THE INVENTION

Figure 1:
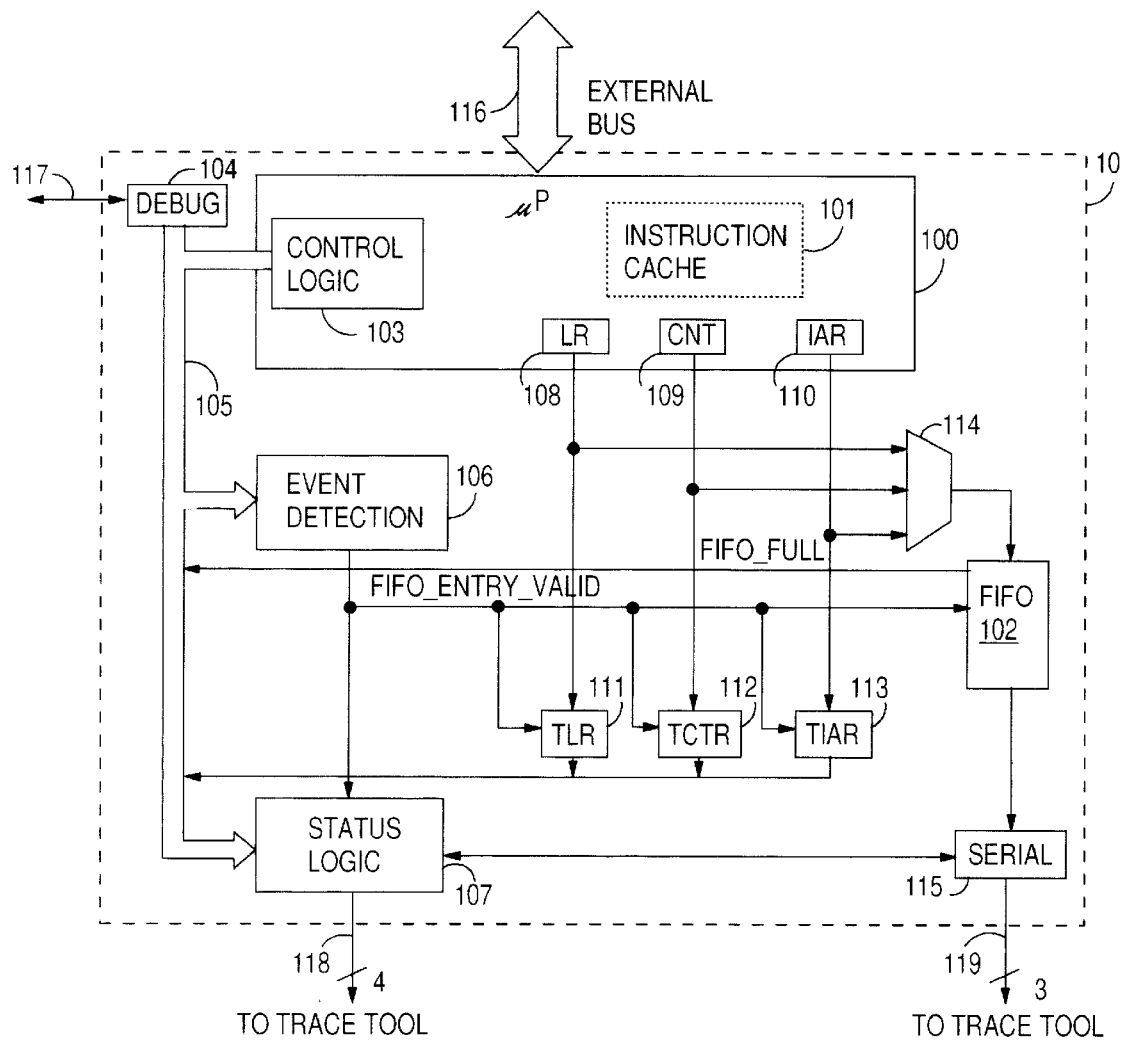
FIG. 1 illustrates a diagram of a preferred embodiment of the present invention for performing tracing of a typical microprocessor.

Referring now to the drawings wherein like or similar elements are designated by the same reference numeral through the several views and, wherein the following description numerous specific details are set forth such as specific word or byte links, etc., to provide a thorough understanding of the present invention. However, it will be obvious to those skilled in the art that the present invention may be practiced without such specific details. In other instances, well-known circuits have been shown in block diagram form in order not to obscure the present invention in unnecessary detail. For the most part, details concerning timing considerations and the like have been omitted inasmuch as such details are not necessary to obtain a complete understanding of the present invention and are within the skills of persons of ordinary skill in the relevant art.

Referring to FIG. 1, there is illustrated a block diagram of a preferred embodiment of the present invention. An integrated circuit includes logic for performing the tracing of program code running out of an embedded cache (instruction cache 101) within microprocessor 100.

Shadow lines 10 embody elements of the present invention which may be incorporated on a single silicon chip.

Microprocessor 100 may comprise any one of the numerous commercially available microprocessors, e.g., the PowerPC microprocessor, model no. PPC403GA, available from IBM Corporation, the assignee of the present invention. It is to be assumed that microprocessor 100 contains all the usual and well-known microprocessor elements and functionality and performs in the usual manner. Microprocessor 100 includes embedded instruction cache 101; microprocessor 100 can execute code residing in cache 101 without accessing external memory through external bus 116.

Link register ("LR") 108 is an architected register used to provide a branch target address for a "branch conditional to link register" instruction, and to hold the return address after "branch and link" instructions. Count register ("CNT") 109 is an architected register used to hold a loop count that can be decremented during execution of "branch" instructions that update this register. CNT 109 is also utilized to provide the branch target address for a "branch conditional to count register" instruction.

CNT 109 is typically used as a counter for FOR-DO loops or as an alternative to subroutine returns within microprocessor 100. LR 108 is typically used for subroutine CALL/RETURN sequences within microprocessor 100.

Instruction address register ("IAR") 110 (commonly known as the program counter) is a register that contains the address of the current instruction being executed within microprocessor 100 at any one point in time.

Registers 108–110 are architected registers that are typical in microprocessor designs. CNT 109 and LR 108 are software accessible using the instructions MTLR, MFLR, MTCTR and MFCTR, which are well-known in the art. These instructions move values between these registers and general purpose registers within microprocessor 100. They are also used by the BCCTR and BCLR branch instructions as branch targets, or as in the case of the BCL, LR 108 is loaded with the return address to be used at a later time. Again, such instructions are well-known in the art. IAR 110 is an internal processor resource that is used to keep track of the instruction address that is currently being executed. As a result of the above, registers 108–110 are physically accessible by the present invention in well-known manners.

Trace link register ("TLR") 111 is a register that holds the value of LR 108 at the time of initiation of a trace event. The value of TLR 111 can be read by a trace tool (not shown) coupled to circuit 10.

Trace count register ("TCTR") 112 is a register that holds the value of CNT 109 at the time of initiation of a trace event. The value of TCTR 112 may be read by the trace tool.

Trace instruction address register ("TIAR") 113 is a register that holds the value of IAR 110 at the time of initiation of a trace event. The value of TIAR 113 may be read by the trace tool.

Mux 114 multiplexes contents from LR 108, CNT 109 and IAR 110 for input into FIFO 102, which is a trace FIFO used to store trace address information for later output to the trace tool.

Registers 111–113, mux 114 and FIFO 102 may consist of commercially available registers, multiplexors and FIFO's, which are known to those skilled in the art.

Trace serialization logic ("serial circuit") 115 serializes the trace FIFO data received from FIFO 102 for serial broadcast over a 3-bit bus to the trace tool.

Trace event detection logic ("event detection") 106 is circuitry utilized for comparing processor internal states with trace events set by the trace tool under user control. When a match is determined, the FIFO_ENTRY_VALID signal is activated and provided to various elements within circuit 10, including FIFO 102, TIAR 113, TCTR 112, TLR 111, status logic 107, and serial circuit 115.

Trace control logic circuit 103 provides processor 100 state information to event detection logic 106 and trace status logic 107, which is the logic circuitry that generates trace execution signals and trace control signals for broadcast to the trace tool. Control logic circuit 103 provides microprocessor 100 signals via bus 105 to accomplish instruction address tracing, data address tracing, signals that a MTLR/MTCTR/exception have occurred inside processor 100 and various other internal states of microprocessor 100. One skilled in the art will be able to design control logic 103 based on the functionality described for circuit 103 provided herein.

Debug logic circuit 104 provides interfacing between circuit 10 and a user for allowing various trace events to be enabled, and for reading out the contents of TLR 111, TCTR 112 and TIAR 113. Trace events may also be enabled via software executed within the data processing system employing circuit 10 via bus 116.

As briefly discussed above, it is an object of the present invention to provide a technique for tracing the instruction flow of code within microprocessor 100 in spite of the fact that microprocessor 100 employs instruction cache 101, which may hold portions of the code for fetching by microprocessor 100. It is a goal of the present invention to provide a means for tracing the instruction flow within microprocessor 100 without affecting the processing of the instruction flow. As will be discussed below, this is accomplished by monitoring the contents of registers 108–110 through the use of FIFO 102.

As discussed above, the user of the present invention will have knowledge of the program code being executed within microprocessor 100, and will, as discussed below, have knowledge of the exact instruction at the beginning of an initiated trace. As a result, from the beginning of a trace, the user will be able to follow the flow of instructions within microprocessor 100 by following a copy of the code. By knowing (1) the static listing of the code, (2) the address of the instruction at which the trace started, (3) the number of instructions executed, (4) which if any of these instructions were taken branches, (5) the target address of those branches taken (whether determined from (a) the program listing, (b) the initial value of other potential branch target resources, (c) from the broadcast values of these potential branch target resources), (6) the occurrences of any exceptions and the addresses to which they vectored, it is possible for the trace tool to reconstruct the real-time program flow in an algorithmic and methodical way.

Further, the user will be able to follow any absolute branching within the code, since such branching is absolutely determined, and as such, is not dependent upon any other event or value within microprocessor 100. However, the user will not be able to follow the code through conditional branching, since such branch conditionals are the result of true or false decisions being made within the code while running in microprocessor 100, and are dependent upon other events, values, or states within microprocessor 100. For example, the user, while following the source code, will eventually come across a branch conditional being executed by microprocessor 100. Such a branch conditional may have a conditional branch exiting therefrom to another portion of the code, which is not the next instruction within the code, such as a "RETURN" or "GOTO" loop within the code. In this instance, the user must have knowledge of whether or not a branching has occurred, and to what address, in order to continue following the code while tracing the operation of microprocessor 100. The present invention allows such monitoring of branch conditionals by storing and broadcasting to a trace tool addresses from LR 108, CNT 109 and IAR 110.

Debug interface logic 104 is coupled externally from chip 10 through JTAG standard interface 117. The IEEE Std. 1149.1–1990, IEEE Std. Test Access Port and Boundary-Scan Architecture, defines circuitry that may be built into an integrated circuit to assist in the test, maintenance, and support of assembled printed circuit boards. The circuitry includes a standard interface (consisting of four mandatory signals and one optional signal) through which instructions and test data are communicated. The standard for interface 117 also provides a means of accessing and controlling features built into the digital integrated circuits. This means may be utilized for controlling debug and trace facilities.

Through debug circuit 104, the user may begin a trace process. For example, instructions may be given to debug circuit 104 to begin a trace at a data breakpoint, i.e., when a read or write of certain data is accomplished within microprocessor 100.

Debug circuit 104 is coupled through bus 105 to control logic 103, event detection circuitry 106 and status logic 107.

Essentially, a user sets up a trace by directing the circuitry within chip 10 to begin tracing when certain conditions occur. This is performed by control logic 103 monitoring addresses and control within microprocessor 100 and supplying these monitored addresses and control signals to event detection circuit 106, which performs a comparison with the debug event designated by the user through debug circuit 104. When event detection circuit 106 determines that the designated debug event has occurred, it transmits a valid tag, e.g., a "1" bit, FIFO_ENTRY_VALID to TLR 111, TCTR 112, TIAR 113.

Figure 4:
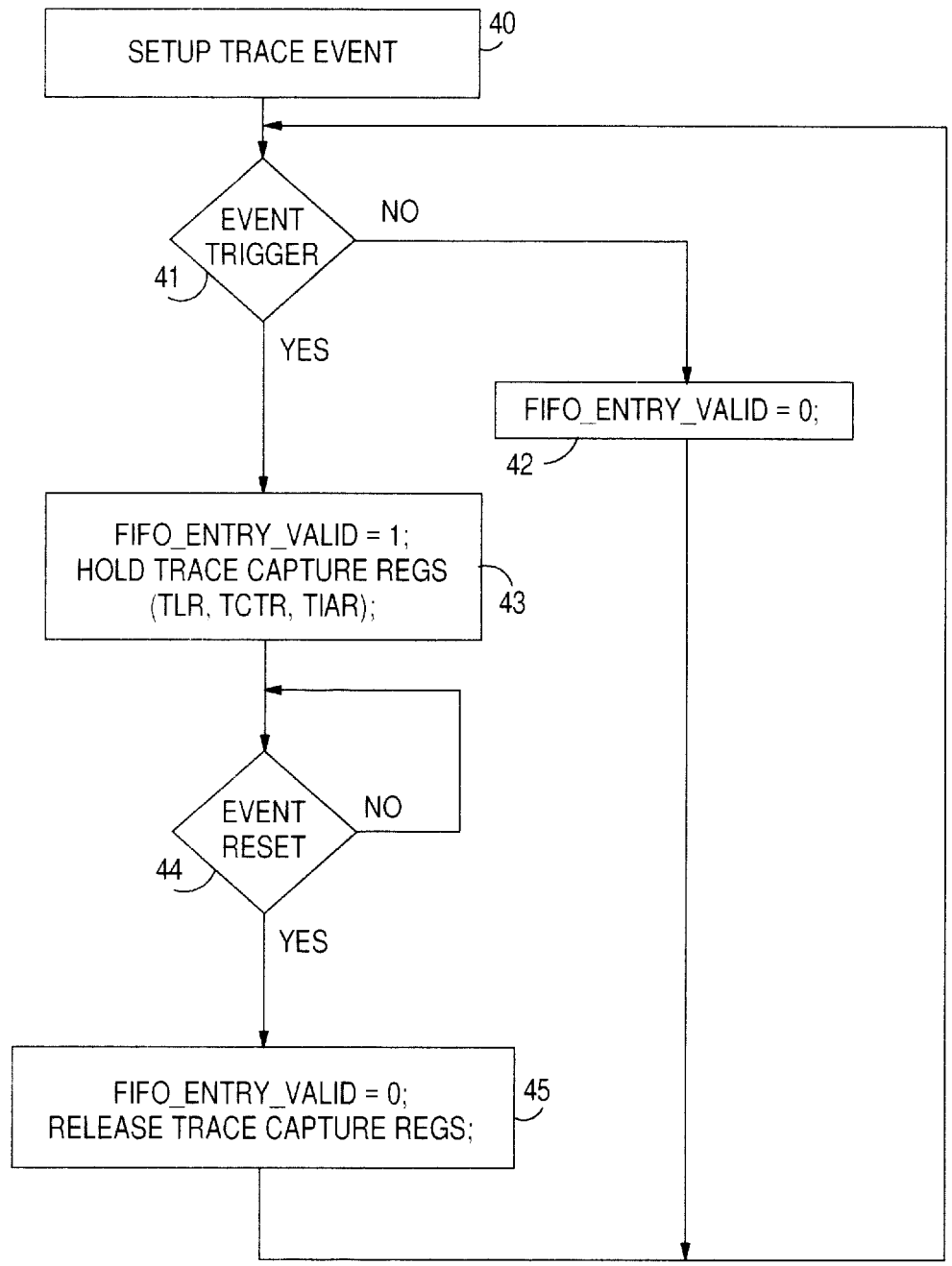
FIG. 4 illustrates a flow diagram of event detection in accordance with a preferred embodiment of the present invention.

This process is further illustrated in FIG. 4, wherein the user sets up a trace event at step 40. Thereafter, at step 41, event detection circuit 106 performs the comparison process and continues to transmit a "0" bit (FIFO_ENTRY_VALID) until a positive comparison is made. When such a positive comparison is made by event detection circuit 106, at step 43 FIFO_ENTRY_VALID is set to a "1" bit. Additionally, registers TLR 111, TCTR 112 and TIAR 113 provide information captured from registers LR 108, CNT 109 and IAR 110, respectively, to debug logic 104 via bus 105, which information is accessible to the trace tool via JTAG interface 117. These captured register values provide the initial register values for when the trace event has begun.

At step 44, the trace will continue until a reset signal has been received from the user through interface 117 and debug circuit 104 to event detection circuit 106, which then changes the value for FIFO_ENTRY_VALID to a "0" bit (step 45). Additionally, at such an instance, registers TLR 111, TCTR 112 and TIAR 113 are allowed to release their captured values. The process would then return to step 41 to wait for another event trigger. The flow diagram illustrated in FIG. 4 may be utilized by one skilled in the art for designing event detection circuit 106.

During step 44 above, the trace process is being performed within chip 10. During that time, the trace tool is being allowed to collect information necessary to allow a user to determine the actual sequence of instructions executed by microprocessor 100 while running in real time. FIFO 102 is utilized to store and broadcast MTLR, MTCTR, and exception event addresses from registers 108–110. The MTLR and MTCTR instructions move a value from a general purpose register to LR108 and CNT 109, respectively, to be used later by branch instructions. As indicated above, the occurrences of these events are much less frequent than branch instructions within microprocessor 100. Based on a statistical analysis, it has been determined that FIFO 102 need only be four entries deep so that microprocessor 100 is never stalled by the trace process by any reasonable sequence of instructions. Such a stall would occur if FIFO 102 became backlogged with information from registers 108–110. In such a case, FIFO 102 will transmit a FIFO_FULL signal through bus 105 to control logic 103 to thereby stall processing within microprocessor 100 until FIFO 102 is able to relieve itself of its backlog of data.

Figure 2:
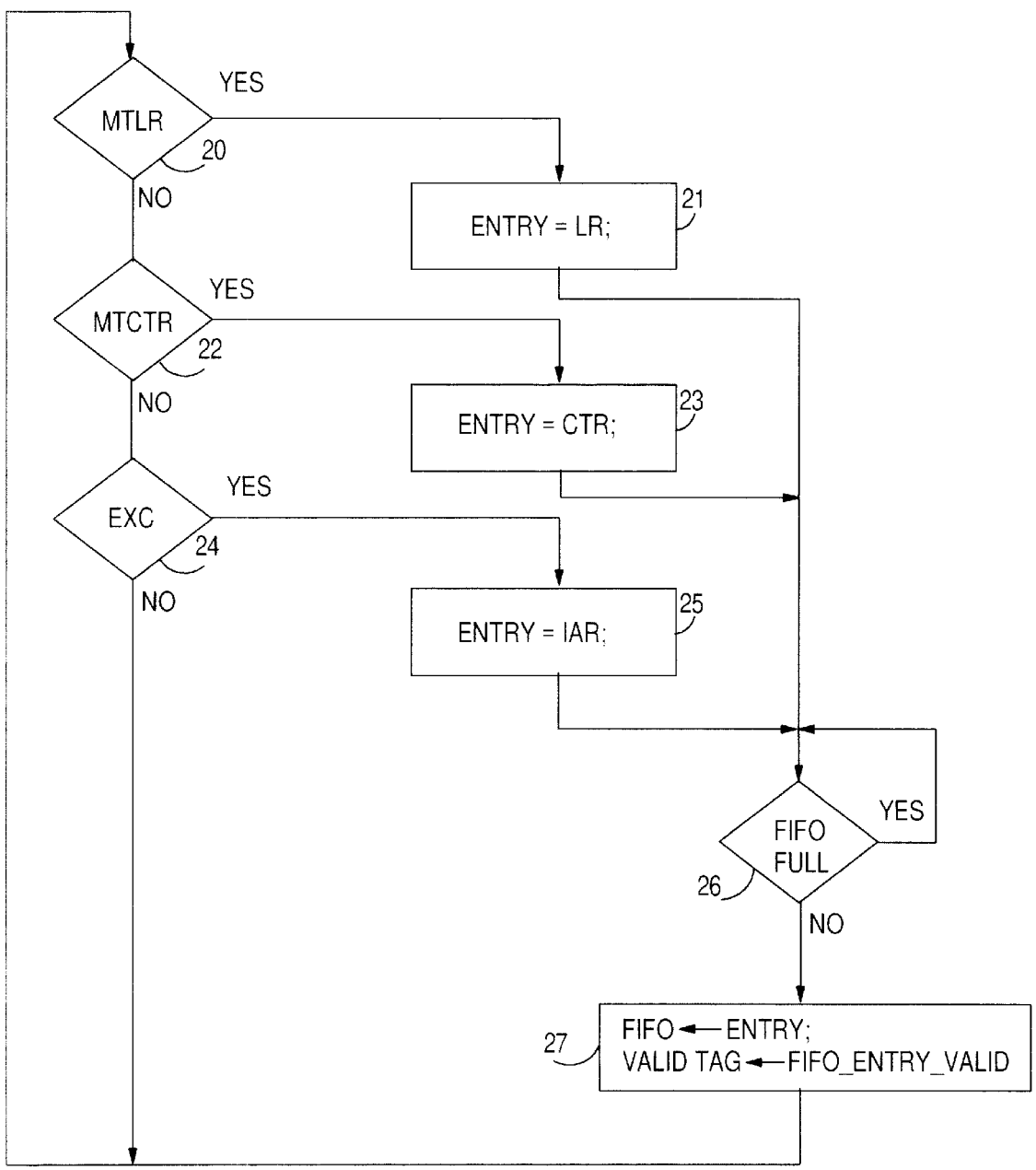
FIG. 2 illustrates a flow diagram of a loading of the FIFO utilized within a preferred embodiment of the present invention.

Referring next to FIG. 2, there is illustrated a flow diagram of the process of loading FIFO 102. Whether or not a tracing process has been initiated (step 44), registers 108–110 are continuing to collect addresses therein, since they are essential portions of microprocessor 100, and thus, the contents of these registers are continuing to be transmitted through mux 114 to FIFO 102.

It should be noted that the various circuits within chip 10 are coupled to a clock signal of microprocessor 100, but this clock signal is not shown since such clock signals are well-known in the art.

As a result of this constant operation of the loading of FIFO 102 whether or not tracing is being performed, when a tracing is initiated by a user, microprocessor 100 does not know of such an event, since the contents of registers 108–110 are being copied through mux 114 to FIFO 102 on a continuous basis.

As noted within FIG. 2, if an MTLR instruction address is present within LR 108, then at step 20, the process moves to step 21 whereby the FIFO value ENTRY is made equal to this MTLR address value. Likewise, in steps 22 and 24, if an instruction address becomes present in registers 109 or 110, their value is transferred over to the ENTRY value for loading into FIFO 102 through mux 114 (steps 23 and 25).

If at step 26 FIFO 102 is full, a stall condition has occurred and the value FIFO_FULL is transmitted to control logic 103, as described above. However, if FIFO 102 is not full, then at step 27, the ENTRY value is entered into FIFO 102. Additionally, FIFO 102 gets the FIFO_ENTRY_VALID value and equates it to its own VALID_TAG value. When this VALID_TAG value is made equal to the "1" bit from the FIFO_ENTRY_VALID value, FIFO 102 then allows its contents to be downloaded to serial circuit 115.

The flow diagram illustrated in FIG. 2 may be utilized by one skilled in the art to design FIFO 102.

Figure 3:
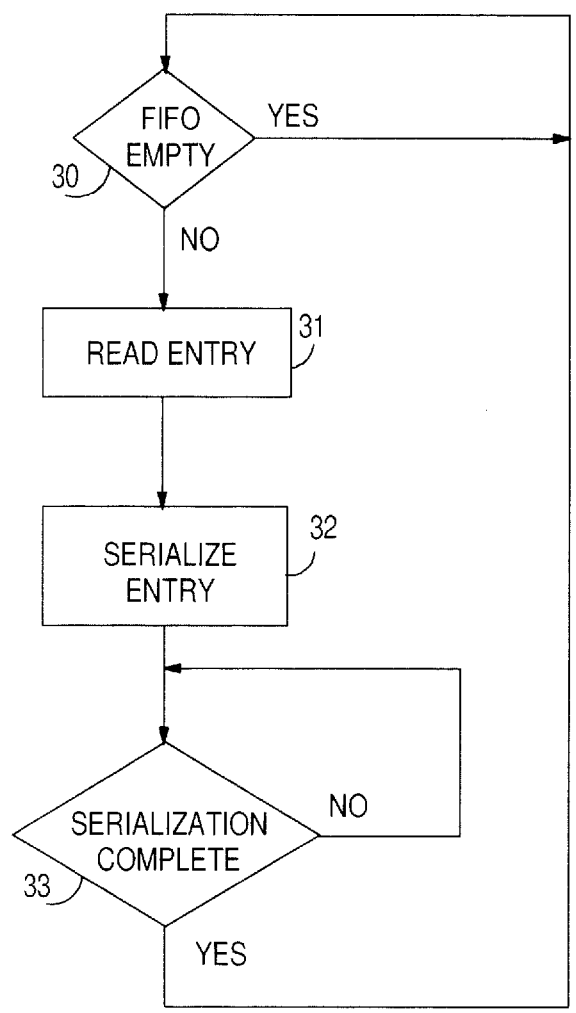
FIG. 3 illustrates a flow diagram of a FIFO serialization operation in accordance with a preferred embodiment of the present invention.

Referring next to FIG. 3, there is shown a flow diagram of the operation of serial logic circuit 115. This flow diagram may be utilized by one skilled in the art to design and build serial logic circuit 115. In step 30, if FIFO 102 is empty, the process loops until FIFO 102 has entries stored therein. Then, at step 31, serial logic circuit 113 reads an entry from FIFO 102. Thereafter, at step 32, serial logic circuit 115 serializes this entry for transmission over the three pins 119. By serially broadcasting each entry (step 33) from FIFO 102 using three pins 119, only 10 microprocessor cycles are required to broadcast a 30-bit address, which is the length of the addresses received from registers 108–110. The use of four-deep FIFO 102 and serial logic 115 virtually prevents any stalling of microprocessor 100 during a tracing process.

As described above, the contents of registers 108–110 are comprised of the addresses being branched to (or the result of an exception condition). These addresses are then eventually broadcast to the trace tool through pins 119 as described above.

Returning to FIG. 1, status logic 107 provides logic circuitry that encodes the status of microprocessor 100. Such status is obtained through bus 105 from control logic 103 which monitors the status of microprocessor 100. Thus, the status of microprocessor 100 can be encoded and broadcast to the trace tool every cycle. In a preferred embodiment of the present invention, the status broadcast over pins 118 will show either: (1) no instruction has been executed within microprocessor 100, or (2) an exception instruction has occurred, or (3) one instruction has been executed and is not a taken branch, or (4) one instruction has been executed and a branch has been taken within the software code running within microprocessor 100, or (5) two instructions have been executed with the second one being a taken branch, or (6) two instructions have been executed with neither of the instructions being a branch instruction.

These encoded values are then broadcast over pins 118 to the trace tool along with the serialized addresses over pins 119. Furthermore, a broadcast tag value received from serial logic circuit 115 is also broadcast over pins 118. This value indicates to the trace tool that the tracing process has begun and essentially prompts the trace tool to begin processing received status and address values from status logic 107 and serial logic 115. The execution status encoded by status logic 107 is broadcast over three pins 118 while the broadcast tag is provided over one of pins 118.

Figure 5:
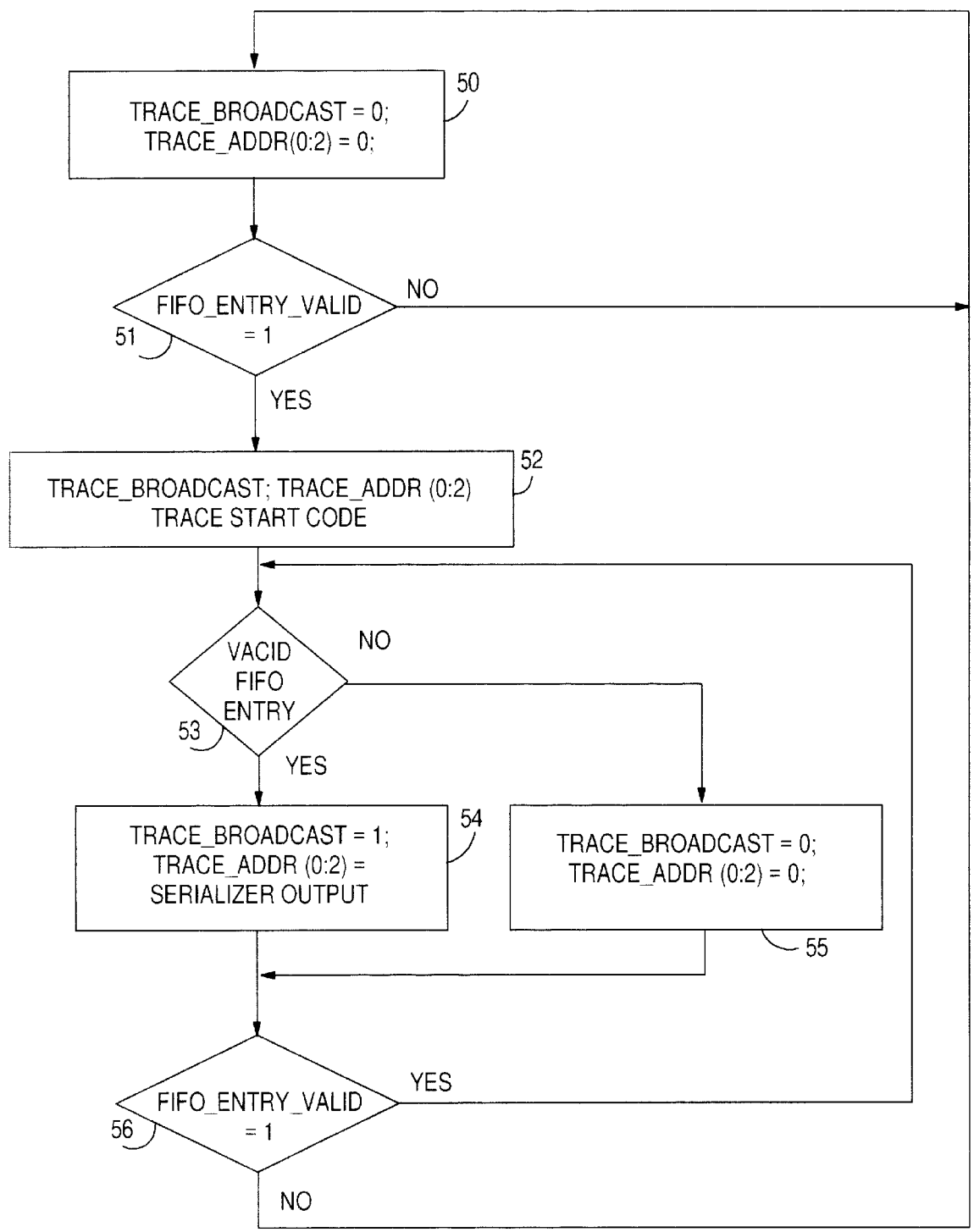
FIG. 5 illustrates a flow diagram of the trace input/output control in accordance with a preferred embodiment of the present invention.

Referring next to FIG. 5, there is illustrated a flow diagram of the process of outputting information from status logic 107 to the trace tool. This flow diagram may be utilized by one skilled in the art in order to design and build status logic circuitry 107. In step 50, until a tracing process has been initiated by a user, "zeros" will be broadcast over pins 118 and 119 for the TRACE_BROADCAST and TRACE_ADDRESS(0:2). At step 51, status logic 107 determines whether or not FIFO_ENTRY_VALID has been initiated to a "1" bit. If not, it continues to broadcast zeros over pins 118 and 119. However, if the FIFO_ENTRY_VALID bit has been initialized to a "1" bit, the process transfers to step 52, wherein the trace start code, which is a special pattern, is driven on these four pins to tell the trace tool that a trace event has occurred. The trace start code is equal to TRACE_BROADCAST and TRACE_ADDRESS(0:2).

Next, at step 53, status logic 107 determines whether or not the FIFO broadcast tag is being received from serial logic 115. If not, at step 55, zeros are continued to be broadcast over pins 118 and 119. Then, at step 56, if the value FIFO_ENTRY_VALID is not a "1" bit, the process within status logic circuit 107 will return to step 50. However, if the FIFO_ENTRY_VALID signal remains a "1" bit, the process again returns to step 53 to await a valid broadcast tag from serial logic 115. Once this tag is received, at step 54, this tag is broadcast over one of pins 118. Additionally, over the other three pins of pins 118, the encoded execution status of microprocessor 100 is also broadcast to the trace tool.

Once the trace tool has captured the appropriate trace information, a reconstruction algorithm may be easily reconstructed from the execution flow of the code. For branch instructions whose targets are not explicit in the operational source code, such as branch to link register ("BLR") and branch to count register ("BCTR"), the target addresses are determined from the broadcast information.

A typical trace tool would interface to debug logic 104 via the IEEE Std. 1149.1–1990 Std. Interface (JTAG 117), and would monitor the seven additional trace pins 118 and 119. A user would use the trace tool to set up the appropriate debug event through debug logic 104 to start a trace. The trace tool would capture the signals on trace pins 118 and 119, and also read out the contents from TLR 111, TCTR 112 and TIAR 113 through debug logic 104. Using a static copy of the original code, and the information captured from processor 100, a software algorithm can reconstruct the execution flow in a manner well-known in the art.

Utilizing the flow diagrams illustrated and the various descriptions herein, one skilled in the art would be able to design and build debug logic 104 so that it would function as described herein.

Figure 6:
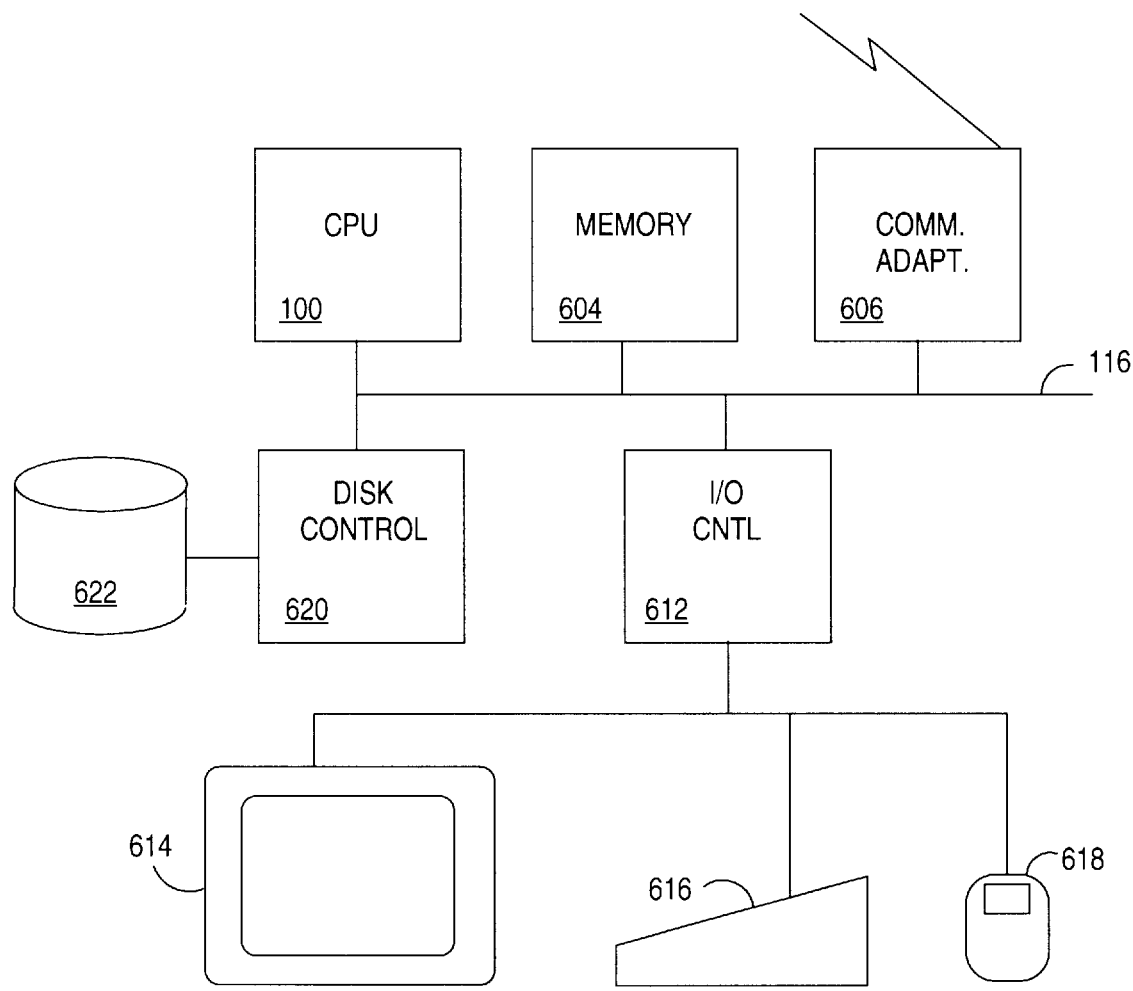
FIG. 6 illustrates a data processing system employing a preferred embodiment of the present invention.

Referring next to FIG. 6, there is illustrated a data processing system operable for implementing the present invention. Processor 100 is coupled via bus 116 to random access memory 604, permanent storage 622, optional communications adapter 606, which enables communication with other systems, input/output controller 612, which controls interaction with video display 164, keyboard 616, pointing device 618, disk controller 620, which controls interaction between processor 100 and permanent storage 622. The devices disclosed are typically available components. A removable diskette or an optical drive could be used in place of a magnetic drive for permanent storage 622 and processor 100 could be comprised of a number of processing engines in a multiprocessor or parallel processing architecture.

In summary, essentially the present invention notifies a trace tool of changes in program flow, i.e., branches and exceptions. Assuming the trace tool is referencing the static code listing, it is necessary to know for every branch whether or not a branch was taken or not and for those branches that have been taken, what was the target of the branch. Targets of branches relative to the instruction address register IAR 110 can be determined from the static listing. This leaves branches relative to other resources. The trace tool needs to be notified what the contents of these resources were at the time of the branch. Instead of broadcasting the target resource value at the time of every branch that uses it, the present invention instead broadcasts the value of the potential target resources only when they are changed. Specifically for a PowerPC processor 100, this includes LR 108 and CNT 109. Furthermore, the only LR 108 and CNT 109 update values that must be broadcast are those that cannot be determined from the static listing.

An example of a very common code sequence, and one that does not need to broadcast the target resources is a subroutine CALL/RETURN sequence. This sequence uses an IAR relative branch instruction that also updates LR 108 with the return address. LR 108 is then used later with a branch instruction to return from the subroutine. This LR 108 update does not need to be broadcast because it can be determined by referencing the static code.

Since most branch targets are IAR 110 relative, their targets do not need to be broadcast at all. Secondly, for those branches whose targets are not IAR relative, but rather use some other resources (i.e., LR 108 or CNT 109), the occurrences of these resource updates that cannot be determined from the listing are far less common than the branches that use them. Specifically, for the PowerPC architecture, the resource updates that must be broadcast are limited to MTLR and MTCTR instructions.

The broadcasting of only those potential branch targets that cannot be determined by the program listing is sufficient to reconstruct the dynamic program flow and at the same time reduce the number of broadcasts required. This minimizes the amount of hardware necessary to provide real-time non-invasive trace. Given the infrequent number of events requiring broadcasts, this limits the conditions under which the processor's execution must be stalled to avoid broadcast overruns to pathological cases. Because of this, these cases can be allowed to stall the processor in normal operation as well as in trace mode, resulting in completely non-invasive behavior.

Although the present invention and its advantages have been described in detail, it should be understood that various changes, substitutions and alterations can be made herein without departing from the spirit and scope of the invention as defined by the appended claims.

What is claimed is:

1. A circuit for tracing real-time program execution within an integrated processor, said processor including an embedded cache memory that provides a portion of a program code executed by said processor, said circuit comprising:

means for continuously monitoring branch target information during a normal operational mode within said processor; and means for providing said branch target information externally from said processor.

2. The circuit as recited in claim 1 wherein said circuit and said processor reside coextensively within a packaged chip, said circuit further comprising:

means for providing said branch target information externally from said chip.

3. The circuit as recited in claim 2 wherein said monitoring means is coupled to one or more registers within said processor.

4. The circuit as recited in claim 3 wherein said one or more registers includes a link register, a count register, and an instruction address register.

5. The circuit as recited in claim 2 wherein said providing means further comprises:

a FIFO coupled to said monitoring means for temporarily storing said branch target information monitored with said processor; and serial logic circuitry, coupled to said FIFO and to one or more external pins of said chip, for serializing said branch target information obtained from said FIFO, said serial logic circuitry providing said serialized branch target information to said one or more external pins.

6. The circuit as recited in claim 2, further comprising:

means for monitoring processor execution status;

means for encoding said monitored status; and means for providing said encoded and monitored status externally from said chip.

7. The circuit as recited in claim 6 wherein said monitoring means comprises control logic circuitry embedded within said processor.

8. The circuit as recited in claim 6 wherein said processor status includes:

instruction execution within said processor;

exception occurrence within said program code; and branch execution within said program code.

9. The circuit as recited in claim 2, further comprising:

means for initiating said tracing of said program execution within said integrated processor.

10. The circuit as recited in claim 9 wherein said initiating means further comprises:

means for receiving an external signal operable to initiate said tracing; and means, coupled to said receiving means, for detecting a particular event within said processor.

11. The circuit as recited in claim 10 wherein said detecting means transmits a trace initiating signal to said providing means.

12. The circuit as recited in claim 9, further comprising:

one or more registers for monitoring said branch target information at initiation of said tracing; and means for providing the contents of said one or more registers externally from said chip.

13. The circuit as recited in claim 5, further comprising:

means for stalling said processor when said FIFO becomes back-logged.

14. A method for tracing real-time program execution within an integrated processor, said processor including an embedded cache memory that provides a portion of a program code executed by said processor, said method comprising the steps of:

continuously monitoring branch target information during a normal operational mode within said processor; and providing said branch target information externally from said processor.

15. The method as recited in claim 14 wherein said branch target information is monitored from one or more registers within said processor.

16. The method as recited in claim 15 wherein said one or more registers includes a link register, a count register, and an instruction address register.

17. The method as recited in claim 14 wherein said providing step further comprises the steps of:

temporarily storing said branch target information, monitored with said processor, in a FIFO; and serializing said branch target information obtained from said FIFO.

18. The method as recited in claim 14, further comprising the steps of:

monitoring processor execution status;

encoding said monitored status; and providing said encoded and monitored status externally.

19. The method as recited in claim 14, further comprising the step of:

initiating said tracing of said program execution within said integrated processor.

20. The method as recited in claim 19 wherein said initiating step further comprises the steps of:

receiving an external signal operable to initiate said tracing; and detecting a particular event within said processor.

21. The method as recited in claim 17, further comprising the step of:

stalling said processor when said FIFO becomes back-logged.

22. An integrated circuit comprising:

a processor;

an embedded memory that provides a portion of a program code executed by said processor;

means for continuously monitoring branch target information during a normal operational mode within said processor; and means, coupled to said monitoring means, for providing said branch target information externally from said processor.

23. The circuit as recited in claim 22 wherein said circuit resides within a packaged chip, said circuit further comprising:

means for providing said branch target information externally from said chip.

24. The circuit as recited in claim 23 wherein said monitoring means is coupled to one or more registers within said processor.

25. The circuit as recited in claim 24 wherein said one or more registers includes a link register, a count register, and an instruction address register.

26. The circuit as recited in claim 23 wherein said providing means further comprises:

a FIFO coupled to said monitoring means for temporarily storing said branch target information monitored with said processor; and serial logic circuitry, coupled to said FIFO and to one or more external pins of said chip, for serializing said branch target information obtained from said FIFO, said serial logic circuitry providing said serialized branch target information to said one or more external pins.

27. The circuit as recited in claim 23, further comprising:

means for monitoring processor execution status;

means for encoding said monitored status; and means for providing said encoded and monitored status externally from said chip.

28. The circuit as recited in claim 23 wherein said chip is coupled to a data processing system comprising:

a memory coupled to said processor;

input means coupled to said processor; and output means coupled to said processor.

29. A data processing system comprising:

a memory means;

an input means;

a display means;

an input/output control means coupled to said display means and said input means;

a processor;

a bus for coupling said memory means, said input/output control means and said processor; and a circuit for tracing real-time program execution within said processor, said processor including an embedded cache memory that provides a portion of a program code executed by said processor, said circuit comprising:

means for continuously monitoring branch target information during a normal operational mode within said processor; and means for providing said branch target information externally from said processor.

* * * * *